United States Patent
Ishibashi et al.

(10) Patent No.: US 7,153,441 B2
(45) Date of Patent: Dec. 26, 2006

(54) METHOD FOR MANUFACTURING THIN-FILM MAGNETIC RECORDING MEDIUM

(75) Inventors: Sinichi Ishibashi, Nagano (JP); Toshinori Iwama, Nagano (JP); Eiji Terashima, Nagano (JP); Masao Kubota, Nagano (JP); Yuji Kobayashi, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 237 days.

(21) Appl. No.: 09/927,089

(22) Filed: Aug. 9, 2001

(65) Prior Publication Data

US 2002/0028358 A1 Mar. 7, 2002

(30) Foreign Application Priority Data

Aug. 10, 2000 (JP) ........................ 2000-243261

(51) Int. Cl.
B44C 1/22 (2006.01)

(52) U.S. Cl. ........................................ 216/22

(58) Field of Classification Search ................ 428/336, 428/462, 463, 694; 427/128, 129, 131, 132; 216/22; 204/192.2, 192.35
See application file for complete search history.

(56) References Cited

U.S. PATENT DOCUMENTS

| | | | | |
|---|---|---|---|---|
| 4,816,334 A | * | 3/1989 | Yokoyama et al. | 428/336 |
| 5,069,967 A | * | 12/1991 | Yokoyama et al. | 428/336 |
| 5,589,263 A | * | 12/1996 | Ueda et al. | 428/336 |
| 5,635,037 A | * | 6/1997 | Chu et al. | 204/192.35 |
| 5,665,460 A | * | 9/1997 | Sugita et al. | 428/212 |
| 5,690,838 A | * | 11/1997 | Moriguchi et al. | 216/22 |
| 5,731,068 A | * | 3/1998 | Mizunoya et al. | 428/212 |
| 5,798,135 A | * | 8/1998 | Ueda et al. | 427/130 |
| 5,837,357 A | * | 11/1998 | Matsuo et al. | 428/212 |
| 5,985,410 A | * | 11/1999 | Chen et al. | 428/141 |

FOREIGN PATENT DOCUMENTS

| | | |
|---|---|---|
| JP | 04-067429 A | 6/1992 |
| JP | 08-315356 A | 11/1996 |
| JP | 1055262 | 9/1998 |
| JP | 10255262 | 9/1998 |
| JP | 11-296849 A | 10/1999 |
| JP | 2000-322710 A | 11/2000 |

OTHER PUBLICATIONS

Patent Abstract of Japan for JP#04–067429 published on Mar. 3, 1992.
Patent Abstract of Japan for JP#11–296849 published on Oct. 29, 1999.
Patent Abstract of Japan for JP#08–315356 published on Nov. 29, 1996.
Patent Abstract of Japan for JP#2000–322710 published on Nov. 24, 2000.

* cited by examiner

Primary Examiner—Parviz Hassanzadeh
Assistant Examiner—Roberts Culbert
(74) Attorney, Agent, or Firm—Darby & Darby (57) ABSTRACT

A thin-film magnetic recording medium is produced by forming a laminate for magnetic data recording on a non-magnetic substrate through a dry process, forming a protection layer on the laminate also through a dry process, plasma-etching the protection layer, and forming a lubricant layer on the plasma-etched protection layer. All steps are completed continuously in a vacuum without abrasion. The surface of the resulting recording medium is substantially smoother than the prior art.

4 Claims, 4 Drawing Sheets

METHOD FOR MANUFACTURING THIN-FILM MAGNETIC RECORDING MEDIUM

BACKGROUND OF THE INVENTION

1. Field of the Invention

The present invention relates to a method for forming a thin-film magnetic recording medium. More particularly, the present invention relates to a method for forming a thin-film magnetic recording medium that facilitates removing foreign particles from a surface of an as-formed protection layer without damaging the protection layer, thereby minimizing signal error.

2. Description of the Related Art

A conventional thin-film magnetic recording medium (hard disk) is disclosed in Japanese Unexamined Laid Open Patent Application No. 2000-200409. This reference discloses a laminate structure including a Cr alloy undercoating layer on a substrate, a Co—Cr alloy nonmagnetic intermediate layer on the undercoating layer, a Co alloy magnetic recording layer on the intermediate layer, a protection layer made mainly of carbon on the magnetic recording layer and a lubricant layer on the carbon protection layer. Many conventional thin-film magnetic recording media do not include an intermediate layer.

Figure 1:
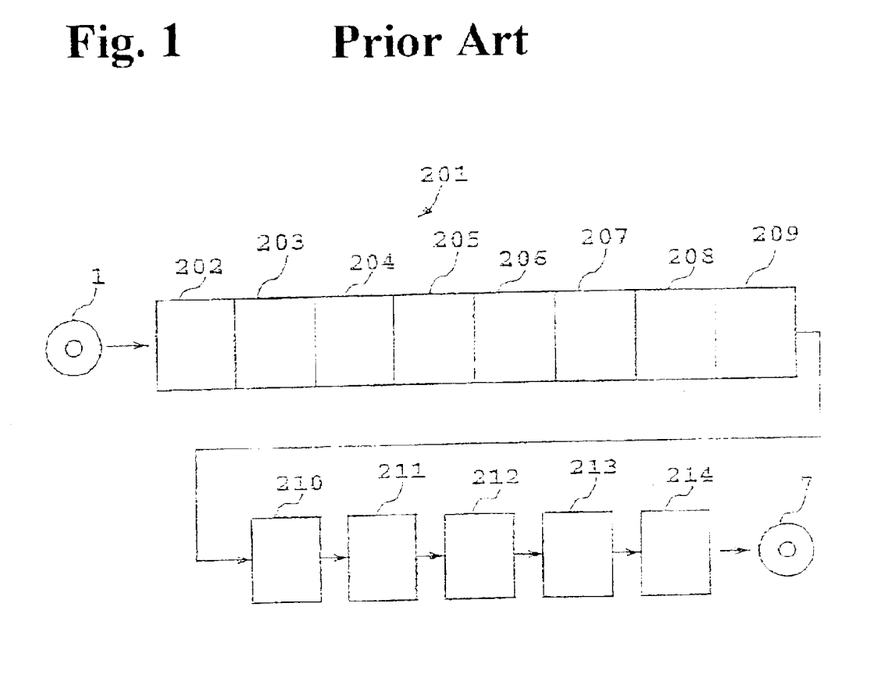
FIG. 1 is a flow chart for manufacturing a conventional thin-film magnetic recording medium.

Referring now to FIG. 1, a conventional method for manufacturing a conventional thin-film magnetic recording medium involves transferring a substrate 1 into a loading chamber 202 of a thin-film deposition apparatus 201. Thin-film deposition apparatus 201 operates under a vacuum.

Substrate 1 is heated in a vacuum heating chamber 203. Substrate 1 is transferred to an undercoating layer deposition chamber 204. In the undercoat layer deposition chamber 204, an undercoat layer is deposited on substrate 1.

An intermediate layer deposition chamber 205 receives substrate 1 wherein an intermediate layer is deposited on the undercoating layer.

A magnetic recording layer is then deposited on the intermediate layer in a magnetic layer deposition chamber 206. If necessary, a cooling chamber 207 cools the laminate formed so far according to process control parameters.

Next, a protection layer deposition chamber 208 deposits a carbon protection layer. The as-formed laminate is removed from thin-film deposition apparatus 201 into room air by an unloading chamber 209.

Thin-film deposition apparatus 201, which maintains a vacuum atmosphere, includes a substrate holding and a transferring means. Prior to processing, substrate 1 is mounted on the substrate holding and transferring means in loading chamber 202. During operation, substrate 1 is processed from substrate loading chamber 202 to substrate unloading chamber 209 during application of the above-described layers.

After processing in thin-film deposition apparatus 201, the surface of the protection layer of substrate 1 is polished with a polishing tape in a step of tape-polishing 210.

In a step of cleaning 211, foreign particles, the main component of which is carbon, (hereinafter referred to collectively as particles) and micro protrusions on the polished surface of the laminate are removed by washing with pure water or with a solvent.

In a step of lubricant coating 212, a lubricant is coated by spin-coated or dip-coated on the now-cleaned surface of the laminate. The coated lubricant is then fixed onto the protection layer surface in air using an ultraviolet layer or by a heating process. Finally, in a step of surface treatment 214, the surface of the fixed lubricant is burnished with a tape or a head (both not shown) to create a magnetic recording medium 7. The head operates, or flies, at a height of several tens of nanometers (nm) above the surface of the magnetic recording medium and operates to read from and write data to the medium.

The conventional method manufactures magnetic recording medium 7 through a complex and burdensome process. If the particles remaining on the as-deposited protection layer are not removed in advance of the step of surface treatment 214, (coating and burnishing the lubricant layer), the head (not shown) will collide with the protrusions on the surface of the lubricant layer caused by the remaining particles. This causes either the head or the magnetic recording medium 7 (or both) to be damaged.

To prevent this damage, the laminate, including the as-deposited carbon protection layer, is removed from the vacuum and any particles remaining on the as-deposited carbon protection layer are removed by tape polishing. Thereafter, the surface of the carbon protection layer is washed with pure water or with a solvent. After removing the remaining particles as much as possible, the lubricant layer is coated.

Unfortunately, any conventional manufacturing method that includes the step of tape-polishing, are necessarily rolls particles in and on the surface of the carbon protection layer, thereby damaging the surface of the carbon protection layer and causing further damage and stress concentrators.

During the step of cleaning the carbon protection layer in the air, oxidation, nitridation, water absorption, and other chemical and physical problems are caused in the surface of the carbon protection layer by exposure to air before the step of coating the lubricant layer. As a result, the surface of the carbon protection layer is modified, the adhesion of the carbon protection layer and the lubricant layer is adversely affected and the quality of the magnetic recording medium is greatly impaired.

OBJECTS AND SUMMARY OF THE INVENTION

It is an object of the present invention to provide a method for forming a thin-film magnetic recording medium.

It is another object of the present invention to provide a method for forming a thin-film magnetic recording medium that facilitates removing foreign particles from a surface of an as-formed protection layer.

It is another object of the present invention to provide a method that facilitates removing foreign particles from a surface without damaging the protection layer thereby stabilizing a flight of a magnetic head and preventing missing signals from causing writing-in and reading-out errors.

The present invention relates to a method for manufacturing a thin-film magnetic recording medium including the steps of forming a laminate for magnetic data recording on a nonmagnetic substrate through a dry process, forming a protection layer on the laminate also through a dry process, plasma-etching the protection layer, and forming a lubricant layer on the plasma-etched protection layer. The present invention completes each step continuously in vacuum and results in a very smooth surface.

According to an embodiment of the present invention there is provided a method for forming a thin-film magnetic recording medium wherein a laminate for magnetic data recording and a protection layer are formed by any method selected from a group consisting of sputtering, ion plating, plasma CVD and vacuum deposition.

According to another embodiment of the present invention there is provided a method for forming a thin-film magnetic recording medium where the step of plasma-etching is conducted in a process gas mixture containing an inert gas and any gas selected from the group consisting of a nitrogen gas, an oxygen gas, a chlorine gas and a fluorine gas.

According to another embodiment of the present invention there is provided a method for forming a thin-film magnetic recording medium where a hard disk drive that mounts a thin-film magnetic recording medium manufactured by the method is highly reliable and minimizes errors such as missing signals and collision of the magnetic head.

According to another embodiment of the present invention there is provided a method for forming a thin-film magnetic recording medium where the degree of vacuum, under which processing is conducted is preferably about $4 \times 10^{-6}$ Torr or lower. Processing vacuum in this range is clearly and easily measurable using vacuum gauges. The inventors know of no prior art including all the elements of the invention with operation in this range. As a result, processing vacuums slightly above and below the above range are not indefinite.

According to another embodiment of the present invention there is provided a method for manufacturing a thin-film magnetic recording medium, comprising the steps of: forming a laminate for magnetic data recording, forming a protective layer on the laminate, plasma-etching a first outer surface of the protective layer, forming a lubricant layer on the first surface. The steps of forming a laminate, forming a protective layer, plasma-etching, and forming a lubricant layer are conducted continuously in a vacuum.

According to another embodiment of the present invention there is provided a method, wherein: the step of forming the laminate is a method selected from the group consisting of sputtering, ion plating, plasma CVD, and vacuum deposition.

According to another embodiment of the present invention there is provided a method, wherein: the step of forming the protective layer is a method selected from the group consisting of sputtering, ion plating, plasma CVD, and vacuum deposition.

According to another embodiment of the present invention there is provided a method, wherein: the step of plasma-etching is conducted in a process gas mixture containing at least an inert gas and a first gas selected from the group consisting of a nitrogen gas, an oxygen gas, a chlorine gas and a fluorine gas.

According to another embodiment of the present invention there is provided a method, wherein: the step of plasma-etching is conducted in a process gas mixture of Ar, $O_2$ and $N_2$ where the mixing ratio thereof is substantially 6:1:3.

According to another embodiment of the present invention there is provided a method, wherein: the step of plasma-etching is conducted in a process gas mixture containing at least an inert gas and a second gas selected from the group consisting of a nitrogen gas, an oxygen gas, a chlorine gas and a fluorine gas.

According to another embodiment of the present invention there is provided a method, wherein: the step of forming the laminate is a dry process, and the step of forming the protective layer is a dry process.

According to another embodiment of the present invention there is provided a method, wherein: the vacuum is at or below about $4 \times 10^{-6}$ Torr.

According to another embodiment of the present invention there is provided a method for manufacturing a thin-film magnetic recording medium, wherein: the nonmagnetic substrate has a nip plated outer layer on an Al alloy base layer, the step of forming the laminate includes a first step of forming a Cr-alloy undercoat layer on the Nip plated outer layer, the step of forming the laminate includes a second step of forming a Co—Cr alloy intermediate layer on the Cr-alloy undercoat layer, and the step of forming the laminate includes a third step of forming a Co—Cr—Pt magnetic recording layer on the Co—Cr alloy intermediate layer.

According to another embodiment of the present invention there is provided a method for manufacturing a thin-film magnetic recording medium, comprising the steps of: forming a laminate for magnetic data recording on a nonmagnetic substrate through a dry process, the nonmagnetic substrate having a Nip plated outer layer on an Al alloy base layer, the step of forming the laminate includes a first step of forming a Cr-alloy undercoat layer on the Nip plated outer layer, the step of forming the laminate includes a second step of forming a Co—Cr alloy intermediate layer**on the Cr-alloy undercoat layer, the step of forming the laminate includes a third step of forming a Co—Cr—Pt magnetic recording layer on the Co—Cr alloy intermediate layer, forming a protective layer on the Co—Cr—Pt magnetic recording layer in a dry process, the protective layer including at least a first component of C, plasma-etching a first outer surface of the protective layer, forming a lubricant layer on the first surface, and the steps of forming a laminate, forming a protective layer, plasma-etching, and forming a lubricant layer conducted continuously in a vacuum.

According to another embodiment of the present invention there is provided a method, wherein: the protective layer further includes at least a second component of N.

According to another embodiment of the present invention there is provided a method, wherein: the step of plasma-etching being a dry plasma-etching in a gas mixture containing at least a first inert gas and a second gas selected from the group consisting of a nitrogen gas, an oxygen gas, a chlorine gas and a fluorine gas.

According to another embodiment of the present invention there is provided a method for manufacturing a thin-film magnetic recording medium, comprising the steps of: forming a laminate for magnetic data recording on a nonmagnetic substrate, the step of forming being a dry processes in a vacuum atmosphere, forming a protective layer on the laminate, the step of forming a protective layer being a dry process in a vacuum atmosphere, plasma-etching a first surface of the protective layer, the step of plasma-etching conducted in a vacuum, the steps of forming a laminate, forming a protective layer, and plasma-etching conducted continuously, and forming a lubricant layer on the first surface of the protective layer, whereby surface defects are minimized and surface quality is improved.

According to another embodiment of the present invention there is provided a method, wherein: the step of forming the laminate for magnetic data recording is a method selected from the group consisting of sputtering, ion plating, plasma CVD, and vacuum deposition.

According to another embodiment of the present invention there is provided a method, wherein: the step of forming the protective layer is a method selected from the group consisting of sputtering, ion plating, plasma CVD, and vacuum deposition.

According to another embodiment of the present invention there is provided a method, wherein: the step of plasma-etching is conducted in a process gas mixture containing an inert gas and a first gas selected from the group consisting of a nitrogen gas, an oxygen gas, a chlorine gas and a fluorine gas.

According to another embodiment of the present invention there is provided a method, wherein: the step of plasma-etching is conducted in a process gas mixture containing an inert gas and a second gas selected from the group consisting of a nitrogen gas, an oxygen gas, a chlorine gas and a fluorine gas.

The above, and other objects, features and advantages of the present invention will become apparent from the following description read in conjunction with the accompanying drawings, in which like reference numerals designate the same elements.

DESCRIPTION OF THE PREFERRED EMBODIMENTS

Figure 2:
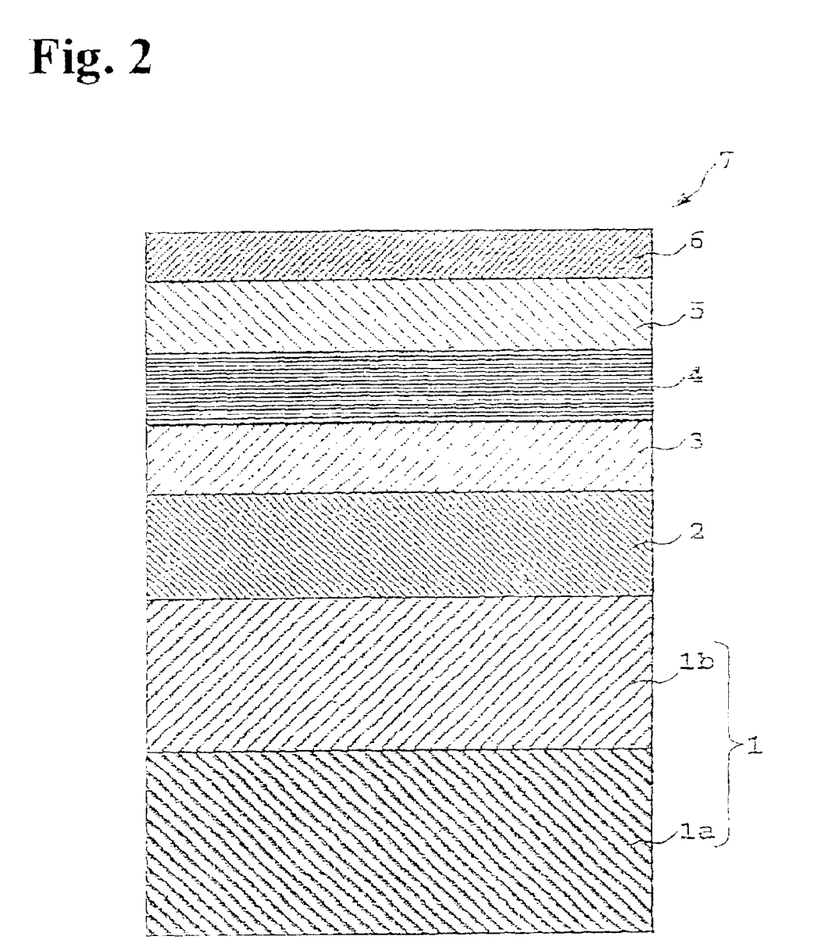
FIG. 2 is a cross sectional view of a thin-film magnetic recording medium manufactured according to the present invention.

Referring now to FIG. 2, a thin-film magnetic recording medium 7 includes a substrate 1. Substrate 1 includes an aluminum alloy plate 1a and a Nip plating layer 1b on aluminum alloy plate 1a. A Cr alloy undercoating layer 2 is deposited on Nip plating layer 1b. A Co—Cr alloy intermediate layer 3 is deposited on Cr alloy undercoating layer 2. A Co—Cr—Pt alloy magnetic recording layer 4 is deposited on Co—Cr alloy intermediate layer 3. A carbon protection layer 5 is deposited on Co—Cr—Pt alloy magnetic recording layer 4. A lubricant layer 6 is deposited on carbon protection layer 5.

Figure 3:
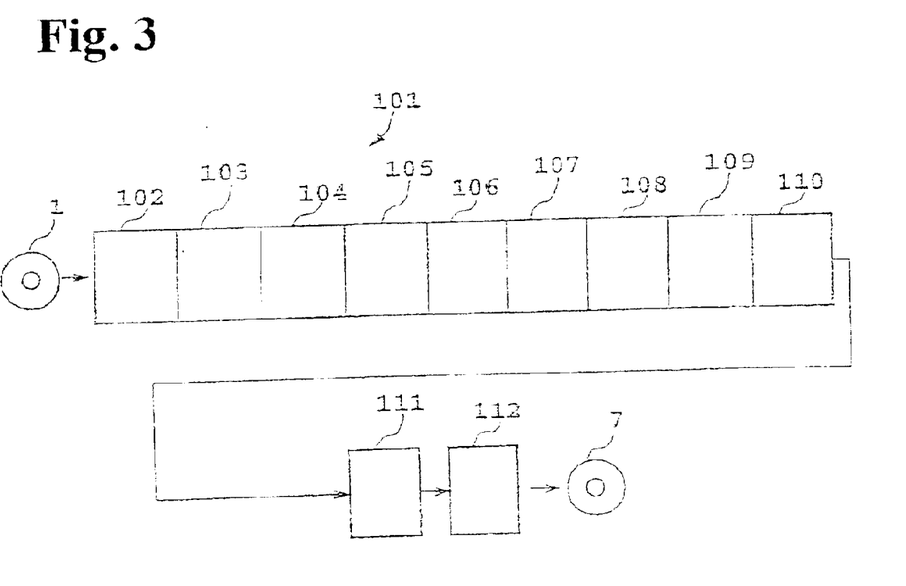
FIG. 3 is a flow chart for manufacturing a thin-film magnetic recording medium according to the present invention.

Additionally referring now to FIG. 3, during manufacture of thin-film magnetic recording medium 7, a thin-film deposition apparatus 101 is maintained under a vacuum. To begin processing, a substrate 1 is mounted on a substrate holding and transferring means, not shown. Substrate holding and transferring means allows substrate 1 to pass through thin-film apparatus 101 for complete processing. Substrate 1 is then loaded in a substrate loading chamber 102. Substrate 1 may be, for example, a glass substrate, a ceramic substrate, a Ti-alloy plate, a plastic substrate, or any other substrate material capable of successfully fulfilling the roll of substrate 1.

Substrate 1 is transferred to a vacuum heating chamber 103 for heating and then to an undercoating layer deposition chamber 104. A Cr alloy undercoating layer 2 is deposited in undercoating layer deposition chamber 104.

A Co—Cr alloy intermediate layer 3 is deposited on Cr alloy undercoating layer 2 in an intermediate layer deposition chamber 105. A Co—Cr—Pt magnetic recording layer 4 is deposited on Co—Cr alloy intermediate layer 3 in a magnetic layer deposition chamber 106. The as-formed laminate is then transferred to a cooling chamber 107 for cooling.

Cr alloy undercoating layer 2 promotes the epitaxial growth of Co—Cr alloy intermediate layer 3 and Co—Cr—Pt alloy magnetic recording layer 4. Co—Cr alloy intermediate layer 3 promotes the epitaxial growth of Co—Cr—Pt alloy magnetic recording layer 4.

Many Cr alloys may be used for Cr-alloy undercoating layer 2. In detail, the Cr alloys used for Cr alloy undercoating layer 2 may include, but are not limited to, $Cr-Mo_{20}$ and $Cr-W_{20}$, as well as other Cr-alloys.

The Co—Cr alloys used for Co—Cr alloy intermediate layer 3 may include, but are not limited to, a Co—Cr alloy, a Co—Cr—Ta alloy, a Co—Cr—Pt—Ta alloy, and a Co—Cr—Pt—B alloy. Particularly, $Co-Cr_{37}$ and a $Co-Cr_{17}-Ta_5$ are used for Co—Cr alloy intermediate layer 3.

The Co—Cr—Pt alloys used for Co—Cr—Pt magnetic recording layer 4 may include, but are not limited to, a Co—Cr—Pt alloy, a Co—Cr—Pt—B alloy, a Co—Cr—Pt—B—Ta alloy and a Co—Cr—Pt—Nb alloy. Particularly, $Co-Cr_{20}-Pt_{10}-B_4$ is used for Co—Cr—Pt magnetic recording layer 4. The materials used for the respective layers are not limited to those described above. Appropriate alternative materials may be used for the respective layers according to the present invention.

Carbon protection layer 5 is deposited on Co—Cr—Pt alloy magnetic recording layer 4 in a protection layer deposition chamber 108. Carbon protection layer 5 is a thin layer having a main carbon component. Particularly, carbon protection layer 5 may include, but is not limited to, a mixture of diamond-like carbon and graphite-like carbon or carbon doped with 8 atomic percent or less nitrogen (N). Carbon protection layer 5 may also include multiple additional carbon types and non-carbon materials sufficient for carbon protection layer 5 to fulfill its designated manufacturing and operational function.

Sputtering, ion plating, plasma CVD, vacuum deposition and other methods may be used to deposit layers 2, 3, 4, and 5 according to manufacture need and demand.

After carbon protection layer 5 is deposited, a surface of the as-deposited carbon protection layer 5 is etched by dry plasma etching in a dry plasma etching chamber 109. Dry plasma etching chamber 109 is maintained under a vacuum. The dry plasma etching step removes particles and micro protrusions from the surface of carbon protection layer 5. A gas mixture containing an inert gas, such as a neon and/or an argon gas, and a gas such as, a nitrogen gas, an oxygen gas, a chlorine gas and a fluorine gas, is used as a process gas for the dry plasma etching step.

Preferable conditions for dry plasma etching in dry plasma etching chamber 109, include using a gas mixture including at least argon and 10% of oxygen, a gas pressure of 1.0 Pa, a RF power supply of 50 W, a RF frequency of 27.12 MHZ, and an etching time of 2.5 sec.

Etching depth is controlled by adjusting the process gas components (oxygen content), the supply of RF power, the etching time and additional dry etching conditions. Preferably, the etching time is minimized so as to avoid impairing operational productivity, determined by the deposition periods of time and other requirements. The etching time is preferably shorter than the minimum time for each process of film-forming prior to etching.

Dry plasma etching is conducted immediately after carbon protection layer 5 is formed. Immediately after formation, the surface of carbon protection layer 5 is from several tens of ° C. to several hundreds ° C. greater than at room temperature and thus retains high free energy (i.e. very active and reactive). Since the surface of carbon protection layer 5 is very active, the particles and the micro protrusions on the surface of carbon protection layer 5, now exposed to the dry plasma etching, are easily removed in a very short time through a combination of evaporation and sublimation. It is therefore possible, to omit and bypass all extraneous conventional cleaning steps including the prior-art steps of tape-polishing washing, previously described.

After plasma etching, the now-formed substrate 1 is transferred into an unloading chamber 110. Unloading chamber 110 allows substrate 1 to enter the air atmosphere while retaining the previously described thin-film deposition apparatus 101 under vacuum.

A lubricant is applied to carbon protection layer 5 in a step of lubricant coating 111.

A step of fixing 112 by heating or irradiating with UV rays, fixes the now-coated lubricant onto carbon protection layer 5, forming lubricant layer 6 and completing thin-film magnetic recording medium 7.

In detail, a lubricant is fixed to carbon protection layer 5 by heating at 110° C. for 60 min or by irradiating with UV rays, with a wavelength of between about 253 nm and about 185 nm, for 20 sec. The lubricant may be coated on carbon protection layer 5 by spin-coating, by dip-coating or by alternative coating methods. The lubricant used for lubricant layer 6 includes a dispersion liquid containing an appropriate solvent and perfluoropolyether (PFPE) or a fluorine lubricant dispersed in a solvent.

It should be understood that conventional manufacturing methods polish a surface of the laminate in air with a tape and burnish the surface of an as-coated lubricant layer with a tape or with a head. Remaining surface defects from tape-polishing frequently cause missing signals and electronic errors. The present invention eliminates this concern, and all physical polishing concerns, by dry plasma etching or other non-physical treatment of carbon protection layer 5. The present invention omits the step of burnishing the surface of a lubricant layer, reduces process time, easily improves quality control, and minimizes production waste.

The present invention facilitates removal of particles and micro protrusions on carbon protection layer 5 under vacuum conditions without requiring additional complicated and costly production steps. The present invention facilitates stabilizing the flight of a magnetic head, not shown. The present invention also stabilizes quality control in manufacturing thin-film magnetic recording media, reduces error-rates, costs and increases mass productivity.

Additionally, hard disk drives including thin-film magnetic recording mediums manufactured according to the present invention are highly reliable and minimize errors, missing signals, and collision of the magnetic head (not shown).

First Embodiment

Substrate 1, 95 mm in diameter, is prepared by plating Nip layer 1*b* on Al alloy disk 1*a*. Substrate 1 is loaded into thin-film deposition apparatus 101. Cr alloy undercoating layer 2, of 6 nm thickness, is deposited on Nip layer 1*b* by DC sputtering for 4 sec under DC discharge at a supplied electric power of 250 W and under an Ar gas pressure of 0.7 Pa.

Co—Cr alloy intermediate layer 3 of 3 nm thickness is deposited on Cr alloy undercoating layer 2 by DC sputtering for 4 sec under an DC discharge at a supplied electric power of 120 W and under Ar gas pressure of 0.7 Pa.

Co—Cr—Pt alloy magnetic recording layer 4 is deposited on Co—Cr alloy intermediate layer 3 by DC sputtering for 5.5 sec under DC discharge at a supplied electric power of 700 W and under an Ar gas pressure of 0.7 Pa.

Then, the laminate including substrate 1 and layers 2 through 4 is cooled in cooling chamber 107. Carbon protection layer 5 is then formed on Co—Cr—Pt alloy magnetic recording layer 4 by DC sputtering for 5.5 sec under DC discharge at a supplied electric power of 1250 W and under an Ar gas pressure of 0.7 Pa.

The surface of carbon protection layer 5 is etched by plasma etching in a process gas mixture of Ar gas containing 10% oxygen gas to remove the particles and micro protrusions on carbon protection layer 5. The etching conditions include a supplied RF power of 50 W, a RF power supply frequency of 27.12 MHZ, and an etching period of time of 2.5 sec per surface of one substrate of 95 mm in diameter.

The surface of the now-formed laminate is etched by plasma etching and removed from thin-film deposition apparatus 101. Then, lubricant layer 6 is formed on the now-etched carbon protection layer 5 by dip-coating a lubricant solution containing a PFPE lubricant dispersed into an organic solvent and by heating the lubricant solution at 110° C. for 60 min to fix the lubricant.

A number of particles on the as-etched carbon protection layer 5 is counted with a particle counter (not shown) before applying lubricant layer 6. The particle counter classifies and counts the particles collected, by vacuum suction, from the surface of the as-etched carbon protection layer 5. The particle counter counts the number of the classified particles.

Figure 4:
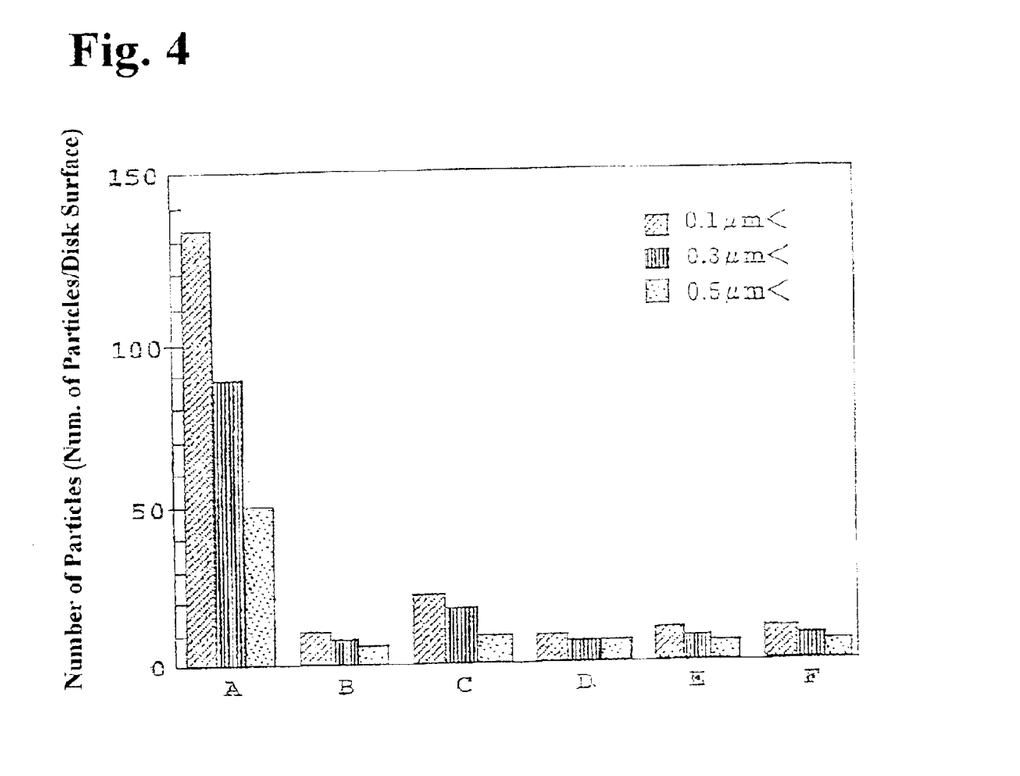
FIG. 4 is a graph comparing the numbers of the particles on the as-etched protection layer of respective magnetic recording media according an embodiment of the present invention.

Additionally referring now to FIG. 4, a graph displays the numbers of particles on as-etched carbon protection layers 5, of respective magnetic recording media, under the embodiments and the comparative examples.

The vertical axis represents the numbers of the particles for three class sizes having diameters of 0.1 μm, 0.3 μm, and 0.5 μm. Results for carbon protection layer 5 according to the first embodiment are designated by the letter B below the horizontal axis.

Missing signal errors are examined by scanning a radial range between 20.60 and 46.63 mm, of the obtained magnetic recording medium, including lubricant layer 6, with a read and write head at a pitch of 12 μm.

Measurement conditions include a scanning line speed of 18.2 mm/s, a signal frequency of 61.6 MHZ and a missing signal (missing pulse) slice level of 65%. Examination on 400 sheets of thin-film magnetic recording media (800 surfaces) reveals that an average number of missing signals is 3.8 pulses per surface.

COMPARATIVE EXAMPLE 1

In comparative example 1, the magnetic recording medium, is manufactured in the same way as in the first embodiment, except that the laminate including the as-deposited carbon protection layer 5 is moved into air without treating the surface of carbon protection layer 5. Head burnishing is conducted after lubricant layer 6 is coated.

The particles on the as-deposited carbon protection layer 5 are counted in the same way as described above before coating lubricant layer 6. The results are described in FIG. 4 and designated by the letter A below the horizontal axis.

The missing signal errors are measured on the magnetic recording medium according to the comparative example 1 in the same way as on the magnetic recording medium in the first embodiment. The average number of missing signals is 9.2 pulses per surface.

COMPARATIVE EXAMPLE 2

Comparative example 2 is manufactured in the same way as the magnetic recording medium according to the first embodiment with the following exceptions. The laminate is moved into air and carbon protection layer 5 is tape-polished and a lubricant layer is coated thereon. The now-coated lubricant layer 6 is burnished by head burnishing. The tape polishing is conducted by pressing polishing tapes, having a grit size of #8000 and a width of 38 mm, onto both surfaces of the laminate under a pressure of several tens of grams and by rotating the laminate at 1000 rpm for 6 sec.

Before coating lubricant layer 6, the particles on the as-tape-polished carbon protection layer 5 are counted after the tape-polishing in the same way as in the first embodiment. The results are by the letter C in FIG. 4. The missing signal errors are measured on the magnetic recording medium in the same way as in the first embodiment and an average number of missing signals is 4.6 pulses per a surface.

COMPARATIVE EXAMPLE 3

Comparative example 3 is manufactured in the same way as the magnetic recording medium according to the first embodiment except that the laminate having carbon protection layer 5 is moved into air, the surface of carbon protection layer 5 is polished with a tape and cleaned with pure water, and a lubricant layer is coated on the as-cleaned carbon protection layer 5, and the as-coated lubricant layer 6 is burnished with a head.

After cleaning with pure water, the particles on the as-deposited carbon protection layer 5 are counted in the same way as in first embodiment before coating lubricant layer 6. The results are designated in FIG. 4 by the letter D. Missing signal errors are measured on magnetic recording medium 7, according to comparative example 3, in the same way as on the magnetic recording medium in the first embodiment. The average number of missing signals is 4.2 pulses per surface.

Plasma etching in vacuum clearly removes undesirable particles to at least the same extent and often much more successfully than either the conventional steps of tape-polishing in air (according to comparative example 2) or combining conventional tape-polishing and conventional cleaning with pure water (according to comparative example 3).

Thin-film magnetic recording medium 7, according to the first embodiment, resting on plasma-etched carbon protection layer 5, adopts the smooth surface, is not thereafter damaged and greatly reduces missing signal errors. Such a dramatic benefit may be attributed to the surface of thin-film magnetic recording medium 7, since there is no trace of polishing and initial application is on a smooth surface, and to the other dramatic effects of the present invention. As a result, it is not necessary to conduct burnishing after forming lubricant layer 6. This greatly reduces time and production costs and substantially prevents missing signal errors and collision of the magnetic head.

Second Embodiment

Thin film magnetic recording medium 7, is manufactured in the same way as in the first embodiment except that the process gas for vacuum plasma etching is a mixture of Ar, $O_2$ and $N_2$ where the mixing ratio thereof is approximately 6:1:3.

After etching carbon protection layer 5, the particles on the as-etched carbon protection layer 5 are counted before coating lubricant layer 6 as in the first embodiment. The results are described in FIG. 4 and designated by the letter E below the horizontal axis of the figure.

The missing signal errors are measured on magnetic recording medium 7 according to the second embodiment in the same way in the first embodiment. The average number of missing signals is 4.0 pulses per a surface and is shown by the letter E in FIG. 4.

It is clear that even with a process gas different from that of the first embodiment, thin-film magnetic recording medium 7 is as good as in the first embodiment.

Third Embodiment

Thin-film magnetic recording medium 7, according to a third embodiment of the invention, is manufactured in the same way as in the first embodiment except that the surface of carbon protection layer 5 is etched by DC plasma etching with oxygen ions for 3 sec under the following conditions. The electrode facing opposite to the laminate, having carbon protection layer 5, is a carbon electrode, having a DC voltage of −300 V applied. A process gas for the DC plasma etching is a mixture of Ar and $O_2$, having a ratio of about 9:1. A bias voltage of +100 V is applied to the laminate.

After etching carbon protection layer 5, the particles on the as etched carbon protection layer are counted before coating the lubricant layer in the same way as described in connection with the first embodiment. The results are designated by the letter F in FIG. 4.

Missing signal errors are measured on magnetic recording medium 7 according to the third embodiment in the same way as in the first embodiment. The average number of missing signals is 3.9 pulses per a surface.

It is clear that even when the carbon protection layer is etched by DC plasma etching, thin-film magnetic recording medium 7 according to the third embodiment exhibits characteristics similar to those of the first embodiment.

By depositing carbon protection layer 5 and by etching the as-deposited carbon protection layer 5 by plasma etching in vacuum soon after depositing carbon protection layer 5, particles and micro protrusions are easily and cleanly removed. The particles and the micro protrusions, which cause missing signal errors, are removed without employing conventional tape-polishing in air, without employing conventional cleaning techniques with costly pure water or organic solvents, and without employing conventional burnishing techniques.

Thus, thin-film magnetic recording medium 7 is manufactured in a simple and stable manner. Conventional tape-polishing in air and cleaning in air causes surface defects and are not employed thereby substantially eliminating missing signal errors and collisions with the magnetic head (not shown).

It is beneficial to remove surface defects before fixing lubricant layer 6. When surface defects are removed, lubricant layer 6 can be applied with excellent reproducibility. Since the lubricant layer is fixed with excellent reproducibility, a high-quality and very dense magnetic recording medium, which facilitates stable flight of the magnetic head, is manufactured easily, cheaply, stably, and with excellent mass-productivity.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims. In the claims, means-plus-function clauses are intended to cover the structures described or suggested herein as performing the recited function and not only structural equivalents but also equivalent structures. Thus, for example, although a nail, screw, and bolt may not be structural equivalents in that a nail relies entirely on friction between a wooden part and a cylindrical surface, whereas a screw's helical surface positively engages the wooden part, and whereas a bolt's head and nut compress opposite sides of the wooden part together, in the environment of fastening wooden parts, a nail, a screw, and a bolt may be understood as equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for manufacturing a thin-film magnetic recording medium, comprising the steps of:

forming a laminate for magnetic data recording on a nonmagnetic substrate;

said step of forming being a dry process in a vacuum atmosphere;

forming a protective layer on said laminate;

said step of forming a protective layer being a dry process in a vacuum atmosphere;

plasma-etching a first surface of said protective layer;

said step of plasma-etching conducted in a vacuum and in a process gas mixture comprising an inert gas, an oxygen gas, a nitrogen gas, and a gas selected from the group consisting of a chlorine gas and a fluorine gas, wherein particles on the entire surface of the protective layer are removed to make a smooth surface;

conducting the steps of forming a laminate, forming a protective layer, and plasma-etching, continuously; and forming a lubricant layer on said first surface of said protective layer, whereby surface defects are minimized and surface quality is greatly improved.

2. A method, according to claim 1, wherein:

said step of forming said laminate for magnetic data recording is at least one method selected from the group consisting of sputtering, ion plating, plasma CVD, and vacuum deposition.

3. A method, according to claim 2, wherein:

said step of forming said protective layer is a method selected from the group consisting of sputtering, ion plating, plasma CVD, and vacuum deposition.

4. A method for manufacturing a thin-film magnetic recording medium, comprising the step of:

forming a laminate for magnetic data recording on a nonmagnetic substrate;

said step of forming being a dry process in a vacuum atmosphere;

forming a protective layer on said laminate;

said step of forming a protective layer being a dry process in a vacuum atmosphere;

plasma-etching a first surface of said protective layer;

said step of plasma-etching conducted in a vacuum and in a process gas mixture comprising an inert gas, an oxygen gas, a nitrogen gas, and a gas selected from the group consisting of a chlorine gas and a fluorine gas, wherein particles on the entire surface of the protective layer are removed to make a smooth surface;

conducting the steps of forming a laminate, forming a protective layer, and plasma-etching, continuously; and forming a lubricant layer on said first surface of said protective layer, whereby surface defects are minimized and surface quality is greatly improved.

* * * * *